United States Patent
Filho et al.

(10) Patent No.: US 9,600,389 B2
(45) Date of Patent: Mar. 21, 2017

(54) GENERATING PERFORMANCE AND CAPACITY STATISTICS

(71) Applicant: International Business Machines Corporation, Armonk, NY (US)

(72) Inventors: Aldair F. Filho, Belo Horizonte (BR); Phillip Sung Won Oh, Hortolandia (BR)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 14/167,336

(22) Filed: Jan. 29, 2014

(65) Prior Publication Data

US 2015/0212873 A1   Jul. 30, 2015

(51) Int. Cl.
*G06F 17/30* (2006.01)
*G06F 11/30* (2006.01)
*G06F 11/34* (2006.01)

(52) U.S. Cl.
CPC ...... *G06F 11/3082* (2013.01); *G06F 11/3068* (2013.01); *G06F 17/30306* (2013.01); *G06F 11/3409* (2013.01); *G06F 11/3476* (2013.01)

(58) Field of Classification Search
CPC ................. G06F 17/30306; G06F 11/3082
USPC ........................................................ 707/688
See application file for complete search history.

(56) References Cited

U.S. PATENT DOCUMENTS

2005/0182582 A1   8/2005   Chen
2006/0153090 A1   7/2006   Bishop et al.
2011/0078106 A1   3/2011   Luchi et al.
2011/0173350 A1   7/2011   Coronado et al.
2012/0265725 A1*  10/2012  Werner ................. G06F 12/00
                                                                 707/600

OTHER PUBLICATIONS

Author: IBM TDB, IP.com No. IPCOM000015792D, Original Publication Date: Mar. 13, 2002, 2 pages, Retrieved from Internet< RUL: http://www.ip.com/pubview/IPCOM000015792D>.
Igor Trubin, System Management by Exception, Part 6, 2006, 9 pages.

* cited by examiner

*Primary Examiner* — Joshua Bullock
(74) *Attorney, Agent, or Firm* — Schmeiser, Olsen & Watts, LLP; John Pivnichny (57) ABSTRACT

A method and associated system for method for generating performance and capacity statistics that consists of a processor receiving statistical information from a set of monitoring entities that monitor characteristics of one or more computing resources. The processor formats the received statistics for storage in a raw-data repository, then filters and processes the data to extract data items necessary to generate predefined reports and to place the extracted data in a format consistent with historical information. The processor then merges the filtered, formatted data with the historical information to create an integrated history of the characteristics and stores the integrated history in a history repository. This integrated history is automatically translated into reports customized to requirements of particular support personnel, which are then forwarded to local devices from which the support personnel may select, customize, and review the reports.

17 Claims, 3 Drawing Sheets

GENERATING PERFORMANCE AND CAPACITY STATISTICS

FIELD

The present invention relates to automatically aggregating and formatting large volumes of raw data associated with the performance and available capacity of a set of electronic systems and distributing that information to support personnel by means of personal computing devices.

BACKGROUND

Guaranteeing performance and availability of critical resources in a computing environment requires ongoing collection and analysis of resource-capacity and resource-utilization data. It may be necessary to collect and quickly process large volumes of current data in order to allow support personnel to mitigate, resolve or avoid short-term problems or to identify a trend that might trigger such a problem in the future. Aggregating and analyzing such data in a timely manner may require a large, centralized computing resource and data repository capable of capturing and aggregating this large volume of heterogeneous data, culled from a variety of sources. But in more complex computing environments, even a mainframe computer may not be able to translate this raw data into customized analyses tailored to specific support personnel and deliver those analyses to the support personnel quickly enough to address imminent problems.

BRIEF SUMMARY

A first embodiment of the present invention provides a method for generating performance and capacity statistics, the method comprising:

a processor of a computer system receiving a first set of statistical information from a raw-data repository, wherein the first set was stored in the raw-data repository by at least one monitoring entity, and wherein the first set identifies a first characteristic of a first monitored resource of a plurality of monitored resources;

the processor performing a predefined query on the first set of statistical information, wherein the query extracts a first subset of the first set of statistical information, and wherein the first subset is associated with the first characteristic;

the processor retrieving a second subset of historical data from a history repository, wherein the second subset is associated with the first characteristic over a time period that extends back to an earlier point in time, and wherein the earlier point in time precedes the earliest time at which the first set was stored in the raw-data repository;

the processor merging the first subset with the second subset such that the merged data is associated with the first characteristic throughout an integrated period of time that extends from the earlier point in time to the earliest time at which the first set was stored in the raw-data repository;

the processor storing the merged data in the history repository;

the processor representing the merged data as a set of reports, wherein the set of reports represents the first characteristic over the integrated period of time;

the processor forwarding the set of reports to a report repository.

A second embodiment of the present invention provides a computer program product, comprising a computer-readable hardware storage device having a computer-readable program code stored therein, said program code configured to be executed by a processor of a computer system to implement a method for generating performance and capacity statistics, the method comprising:

the processor receiving a first set of statistical information from a raw-data repository, wherein the first set was stored in the raw-data repository by at least one monitoring entity, and wherein the first set identifies a first characteristic of a first monitored resource of a plurality of monitored resources;

the processor performing a predefined query on the first set of statistical information, wherein the query extracts a first subset of the first set of statistical information, and wherein the first subset is associated with the first characteristic;

the processor retrieving a second subset of historical data from a history repository, wherein the second subset is associated with the first characteristic over a time period that extends back to an earlier point in time, and wherein the earlier point in time precedes the earliest time at which the first set was stored in the raw-data repository;

the processor merging the first subset with the second subset such that the merged data is associated with the first characteristic throughout an integrated period of time that extends from the earlier point in time to the earliest time at which the first set was stored in the raw-data repository;

the processor storing the merged data in the history repository;

the processor representing the merged data as a set of reports, wherein the set of reports represents the first characteristic over the integrated period of time;

the processor forwarding the set of reports to a report repository.

A third embodiment of the present invention provides a computer system comprising a processor, a memory coupled to said processor, and a computer-readable hardware storage device coupled to said processor, said storage device containing program code configured to be run by said processor via the memory to implement a method for generating performance and capacity statistics, the method comprising:

the processor receiving a first set of statistical information from a raw-data repository, wherein the first set was stored in the raw-data repository by at least one monitoring entity, and wherein the first set identifies a first characteristic of a first monitored resource of a plurality of monitored resources;

the processor performing a predefined query on the first set of statistical information, wherein the query extracts a first subset of the first set of statistical information, and wherein the first subset is associated with the first characteristic;

the processor retrieving a second subset of historical data from a history repository, wherein the second subset is associated with the first characteristic over a time period that extends back to an earlier point in time, and wherein the earlier point in time precedes the earliest time at which the first set was stored in the raw-data repository;

the processor merging the first subset with the second subset such that the merged data is associated with the first characteristic throughout an integrated period of time that extends from the earlier point in time to the earliest time at which the first set was stored in the raw-data repository;

the processor storing the merged data in the history repository;

the processor representing the merged data as a set of reports, wherein the set of reports represents the first characteristic over the integrated period of time;

the processor forwarding the set of reports to a report repository.

DETAILED DESCRIPTION

Although most computerized systems comprise a reporting or logging feature that lets support personnel monitor system performance or resource utilization, such functions may be cumbersome to use in a real-world implementation. This is especially true in a multi-system or distributed environment that comprises multiple, heterogeneous, applications, operating systems, management systems, and computing platforms. In such an environment, differences in reporting features or in data-logging conventions may force support personnel to wade through enormous amounts of continuously updated raw data stored in incompatible formats, saved at different sites on different types of media, or updated according to different schedules.

It may also be difficult and time-consuming to use manual means to design reports that correlate data collected from different types of systems, even if those systems are integrated into a single platform or are used to perform components of a common function. Furthermore, many proprietary reporting or monitoring means are not able to store data over longer periods of time, or to analyze stored data culled over longer periods of time from multiple sources, in order to identify trends.

It may thus be difficult for support personnel to collect, aggregate, organize, format, analyze, and review such information quickly enough to identify a current or impending problem or to identify or infer a trend while there is still time to avoid a service disruption or degradation.

Embodiments of the present invention address these issues by collecting raw data from a variety of systems and resources; storing this aggregation of raw data in a single integrated raw-data repository; organizing and formatting the aggregated raw data into a consistent format; filtering the data to identify a smaller subset that is more easily manageable by local or personal devices; merging the filtered data with historical information culled from a history-repository archive to create long-term reports that include the most current information; and then forwarding the merged-data reports to distributed personal computing devices, where it may be used to create custom views tailored to the needs of specific support personnel.

Some embodiments of this method allow the combination or correlation of multiple types of monitored parameters, thus enabling the method to generate reports that present multivariate statistical information or that use known techniques of multivariate adaptive statistical filtering to compute and display multivariate standard deviations. Such multiple-parameter embodiments allow generated reports to identify, correlate, aggregate, and report characteristics of multiple monitored resources or multiple characteristics of a single resource. Like other embodiments of the present invention, such embodiments may thus allow such multi-variable reports to be displayed and updated in real-time, or quickly enough to allow users to observe a change in one or more monitored parameters in time to reallocate or reconfigure system resources before the change can cause an undesired effect.

In some embodiments, methods of the present invention may be performed continuously or iteratively, where each iteration refreshes the history repository with the latest generation of processed data. In some embodiments, the data-collection steps of this method may be performed iteratively and the subsequent steps may be performed at certain times.

Embodiments of this invention may comprise a continuous process of monitoring systems, retrieving, filtering, and formatting data, and updating reports displayed on or otherwise available to support personnel, wherein that process is performed by means of automatic methods that are fast enough to ensure real-time or near real-time display and updating of the state of the monitored systems. In other words, such embodiments may offer performance sufficient that support personnel are able to view changes in monitored characteristics of a monitored system almost as quickly as they occur.

Embodiments may thus provide robust utilization, capacity, performance, and other types of reports tailored to the needs of specific support personnel, where those reports may be automatically generated quickly enough to comprise current or nearly current data, may be reformatted quickly when a system or application is reconfigured or upgraded, may correlate data captured from multiple systems and resources located in different environments or based on different platforms, and may correlate new data with archived historic data in order to better interpret recently captured information or to identify trends.

Figure 1:
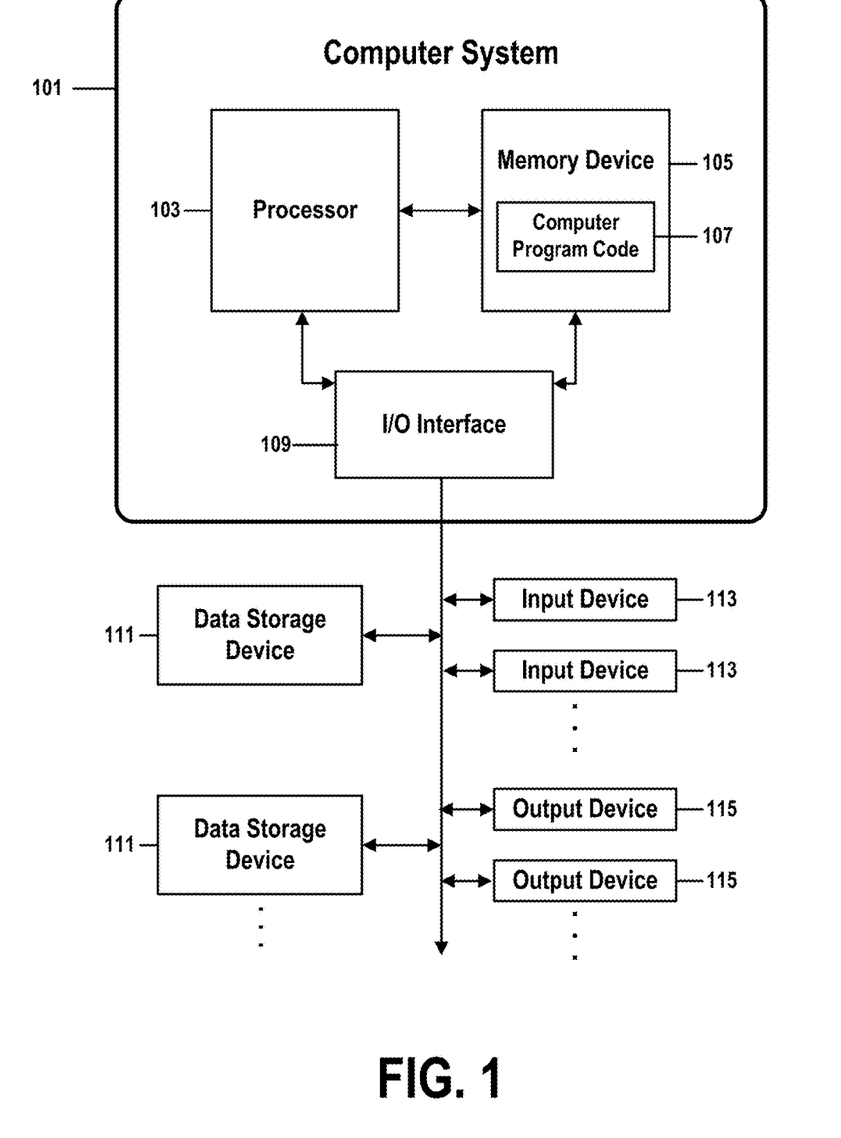
FIG. 1 shows a structure of a computer system and computer program code that may be used to implement a method for generating performance and capacity statistics in accordance with embodiments of the present invention.
Figure 2:
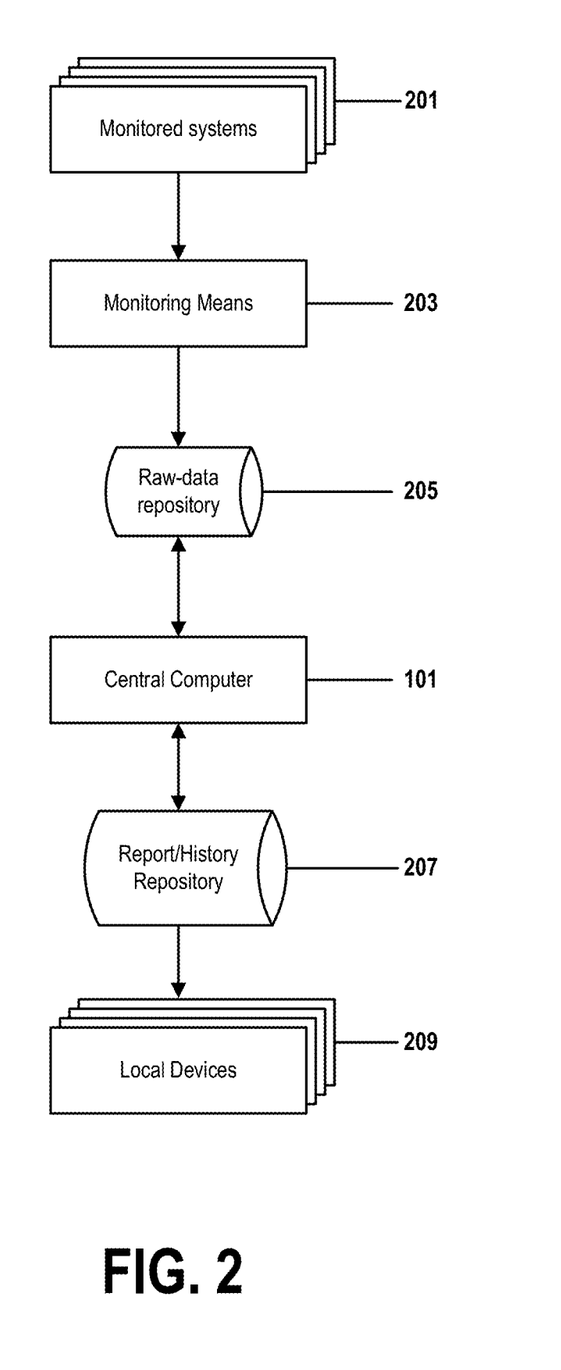
FIG. 2 illustrates the structure of a system architecture of an embodiment of the present invention.
Figure 3:
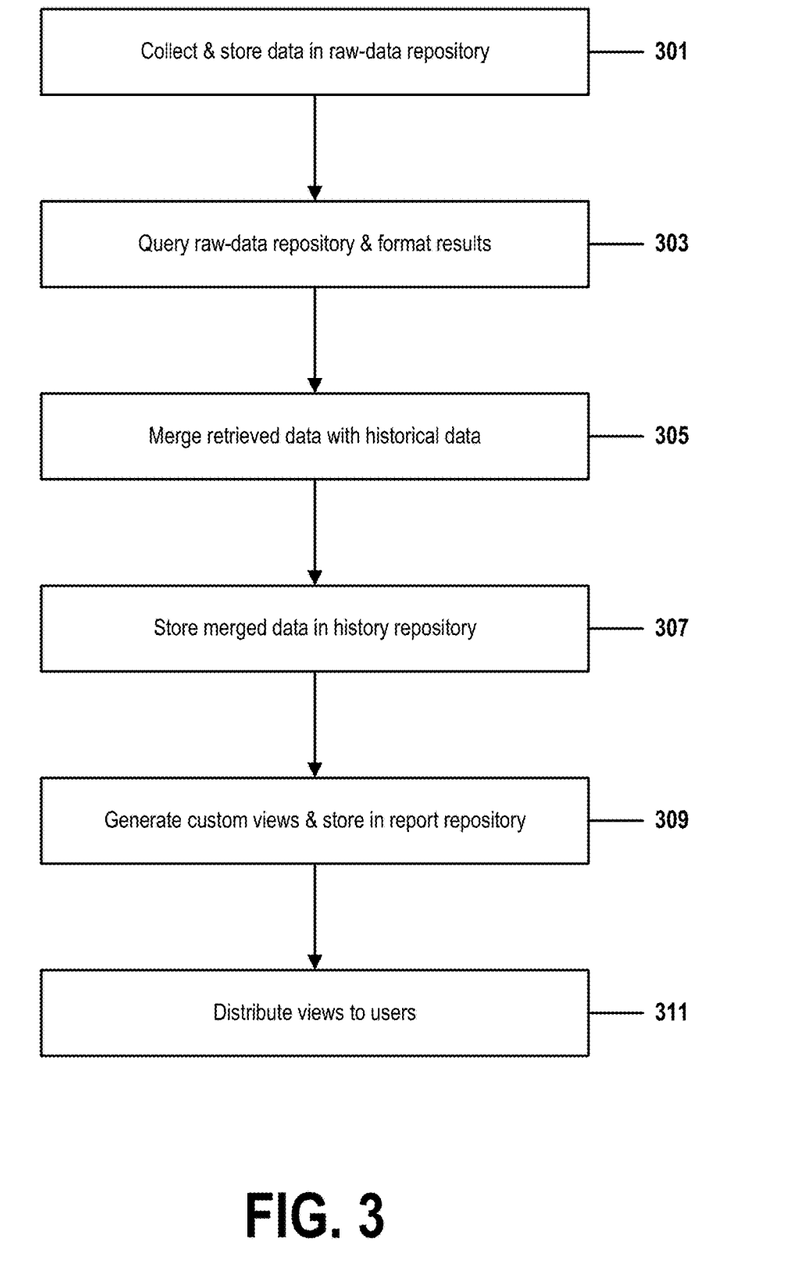
FIG. 3 is a flow chart that illustrates steps of a method for generating performance and capacity statistics in accordance with embodiments of the present invention.

Methods in conformance with embodiments of the present invention may comprise other variations of the method of FIGS. 1-3. Examples cited in this document are for illustrative purposes only and are not meant to limit embodiments of the present invention to characteristics specific to those examples.

FIG. 1 shows a structure of a computer system and computer program code that may be used to implement a method for generating performance and capacity statistics in accordance with embodiments of the present invention. FIG. 1 refers to objects 101-115.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for generating performance and capacity statistics in accordance with embodiments of the present invention, and may implement other embodiments described in this specification, including the methods illustrated in FIGS. 1-3. The data storage devices 111 may store the computer program code 107. Computer program code 107 stored in the storage devices 111 is configured to be executed by processor 103 via the memory devices 105. Processor 103 executes the stored computer program code 107.

Thus the present invention discloses a process for supporting computer infrastructure, integrating, hosting, maintaining, and deploying computer-readable code into the computer system 101, wherein the code in combination with the computer system 101 is capable of performing a method for generating performance and capacity statistics.

Any of the components of the present invention could be created, integrated, hosted, maintained, deployed, managed, serviced, supported, etc. by a service provider who offers to facilitate a method for generating performance and capacity statistics. Thus the present invention discloses a process for deploying or integrating computing infrastructure, comprising integrating computer-readable code into the computer system 101, wherein the code in combination with the computer system 101 is capable of performing a method for generating performance and capacity statistics.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise said computer-readable hardware storage device.

While it is understood that program code 107 for cross-retail marketing based on analytics of multichannel clickstream data may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for cross-retail marketing based on analytics of multichannel clickstream data is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

FIG. 2 illustrates the structure of a system architecture of an embodiment of the present invention. FIG. 2 comprises reference numerals 101 and 201-209.

Reference numeral 201 shows a set of computing systems or other electronic resources. These resources may be any type of system or resource that is to be monitored by an embodiment of the present invention. In an enterprise computing environment, for example, they may comprise combinations of servers, workstations, network-attached storage devices, applications, databases, electronic memories, communications interfaces, mobile devices, cloud-based resources, and other types of electronic devices.

Reference numeral 203 refers to one or more monitoring means by which raw data may be gathered from the monitored entities 201. In some embodiments, this monitoring may continuously gather the latest data from each system 201, such that the gathered data may provide a current or nearly current description of a state of a characteristic of a monitored entity 201. In some cases, the monitoring may gather data in real-time or instantly, such as the way that a temperature sensor may instantaneously capture temperature data.

Monitoring means 203 may comprise, but is not limited to, a combination of any hardware, software, or other means known to those skilled in the art, such as a transaction-logging function of a software application, hypervisor, or operating system; a CPU-utilization monitor; a log that tracks capacity-utilization of rotating or solid-state storage devices; an environmental sensor; and network traffic, capacity, or utilization logs generated by a network-management system.

In a general case, one or monitoring means 203 may be associated with one or more monitored entity 201 in any one-to-one, one-to-many, many-to-one, or many-to-many configuration. One example of such a monitoring means 203 is the IBM Tivoli Decision Support (TDS) application, which collects log data from computer systems that run certain operating systems and that comprise a logging service that conforms to certain log-formatting conventions.

Reference numeral 205 represents a repository of the raw data gathered by the one or more monitoring means 203. The raw data repository 205 may comprise any combination of storage means known to those skilled in the art, such as one or more databases stored on one or more physical or virtual disk drives; one or more data repositories managed by a remote cloud-based or other network-attached service; or locally or remotely stored flat files, spreadsheets, text files, or knowledgebases.

Because of the heterogeneous, nonstandardized, nature of the information captured by monitoring means 203, raw data repository 205 may comprise multiple storage media or may store data in multiple data formats.

In some embodiments, the raw-data repository 205 consists of data stored in only one data-storage format, such as the IBM SMF file format, an Oracle relational database, extensible markup language (XML), or a flat-file format. In other embodiments, the data stored in repository 205 may be stored in several formats that do not differ to an extent that prevents them from being queried by the query means of step 303, FIG. 3.

But even in such embodiments, it is possible that data stored in a similar storage format itself may adhere to different logical data formats. Records received from different systems 201 or by means of different monitoring means 203, might, for example, comprise different selections of data fields, differently sized data fields, differently ordered data fields, different white space characters, or different field delimiters.

In some embodiments, the raw data stored in repository 205 is continuously updated such that the stored data represents a current or a nearly current description of a state of a characteristic of a monitored entity 201. In other embodiments the raw data repository is updated periodically, at certain predefined times, in response to certain events, on demand, or as a function of the operation of the monitored systems 201 or of the monitoring means 203.

As described in FIG. 1, central computer 101 is a computer system that performs some steps of the method of FIG. 3 in accordance with embodiments of the present invention.

Computer 101 may be a single computer system, a distributed computer system, or some other combination of computing resources. In some embodiments, computer 101 may be a mainframe computer system or may be a specialized server in a distributed enterprise network. In other embodiments, the computer 101 may comprise multiple computing resources located at a single site, at multiple sites across a network, at a remote Internet or cloud-based service, at virtual locations across a local-area network or a distributed enterprise network, or combinations thereof. In some embodiments, central computer 101 may be any other type of computing resource capable of performing steps of the method of FIG. 3.

In embodiments of the present invention that comprise a larger number of monitored systems, a larger rate of capturing monitored data, or a larger volume of monitored data, computer 101 must be fast enough and must comprise sufficient storage and processing capacity to be able to quickly process what may be an enormous amount of captured information; and must be connected to raw-data repository 205 by one or more interface means that allow it to exchange data with the repositories 205 and 207 quickly enough to provide useful information to users. Here, users may comprise combinations of clients, support personnel, management account teams, and any other human or automated entities involved directly or indirectly with support or maintenance of a monitored system 201. Real-time statistics showing daily performance trends and supporting trend analysis for capacity planning in the long-term scenarios can be verified with the actual charts produced in the final process.

Reference numeral 207 represents a repository of information that has been processed and stored by the central computer 101 or by local devices 209. Repository 207 may comprise a report repository, a history repository, or both. In some implementations, storage of these two repositories may be split between two or more distinct physical or virtual media or between two or more distinct logical entities, such as a DB2 database and a set of Oracle databases. In other embodiments, these two repositories may share a single physical, virtual, or logical storage platform, such as a data warehouse.

In general, the Report/History Repository 207 may comprise any physical or virtual platform, topology, or logical entity known to those skilled in the art of data storage and data retrieval. As with raw-data repository 205, report repository 207 may comprise any combination of storage media and data-storage formats known to those skilled in the art.

Regardless of whether the history repository 207 shares a common platform with the report repository 207, the data stored in the history repository consists of formatted information that has been stored by computer 101 during one or more previous iterations of the method of FIG. 3. Such stored information may comprise historic data that may be used to identify trends that affect a performance or utilization characteristic of a monitored system 201.

Regardless of whether the report repository 207 shares a common platform with the history repository 207, the data that comprises the report repository consists of reports, data views, logs, and other types of user-accessible information that has been stored by the central computer 101 or by a local device 209 during a previous iteration of the method of FIG. 3.

Reference numeral 209 identifies one or more personal devices accessible to one or more users. These devices may comprise, but are not limited to, combinations of workstations, desktop computers, notebook computers, smartphones, tablets, thin-client devices, or other virtual or physical devices capable of selecting or displaying information retrieved from the report/history repository 207, or of performing local processing operations upon information forwarded to the personal device 209 by the central computer 101.

In some embodiments, these local devices 209 may be connected to the central computer 101 by means of a computer network, a cellular network, or a direct hardwired connection, or may be workstations or thin clients configured as components of the central computer 101. In other embodiments, regardless of whether local devices 209 communicate directly with the central computer 101, the local devices 209 may read and write information to and from the report and history repositories 207.

FIG. 3 is a flow chart that illustrates steps of a method for generating performance and capacity statistics in accordance with embodiments of the present invention. FIG. 3 comprises steps 301-311.

In step 301, the one or more monitoring means 203 monitor, collect, aggregate, organize, and store raw data in raw-data repository 205. This raw data, as described in FIG. 2, may comprise any sort of information related to the health, availability, utilization, queue times, response times, environmental conditions, or other characteristics of one or more monitored systems 201, where the characteristic is relevant to support, performance, or maintenance of the monitored systems 201.

Such raw data might include, for example, CPU-utilization or memory-utilization statistics of a computer processor, storage-capacity data of a hard drive, a fluctuation in a number of concurrent users, tasks, or processes of a computing resource, network traffic statistics, a description of how network resources are allocated to various types of multimedia content, records of time-dependent or season-dependent fluctuations in usage, system-response times, database-access times, application-response times, communications latency times, ambient temperatures or humidity levels within or external to a device chassis, or power-consumption figures. Many other types of raw data may be gathered, depending on specific needs of each implementation of a system 201. In some embodiments, collected raw data may comprise composite or complex types of data that identify relationships among two or more types of monitored data.

A monitoring means 203 may monitor this raw data continuously; may at certain times poll one or more monitored systems 201 or one or more peripherals, software, or services associated with a system 201; may receive raw data pushed to the monitoring means 203 by a distinct entity; or may receive raw data through a combination of these methods or through any other method known to those skilled in the art of collecting and aggregating data.

The monitoring means, or other hardware or software associated with the means, stores the raw data in a central raw-data repository. This stored data may be stored in a variety of formats that may comprise, but are not limited to, combinations of relational databases, flat files, knowledge-bases, spreadsheets, LDAP file structures, XML code, tables of system information, inverted files, or free text. In some embodiments, a choice of formats may be a function of characteristics of the monitored systems 201, of the monitoring means 203, of a data-collection or monitoring service, application, or hardware device associated with a monitored system 201, or of a platform on which one or more components of raw-data repository 205 are implemented.

In some embodiments, the raw-data repository 205 may comprise multiple physical or virtual storage platforms at one or more physical locations. Such platforms may comprise, but are not limited to, physical hard drive partitions, virtual hard drives, remote network-attached storage, mobile devices, or cloud-based storage services.

In some embodiments, the raw data stored in raw-data repository 303 might be stored in a single logical entity or in a single data-storage format, such as an Oracle database, as data stored as a set of IBM FMS files, as a data warehouse, or as one or more Excel spreadsheets.

Embodiments that comprise a large number of monitored systems 201 or that serve a large number of users or activities may store extremely large volumes of raw data in step 301.

In all embodiments, at least some of the raw data stored in repository 205 must be stored in a format that allows it to be queried in step 303. In some cases, this may entail an initial evaluation or processing step that ensures that collected data conform to one or more conventions or standards that allow it to be stored in a manner consistent with characteristics of the raw-data repository 205.

In step 303, central computer 101 queries the raw data in raw-data repository 205 in accordance with predefined query criteria. This query may be performed by any means known to those skilled in the art, such as one or more SQL queries, an other type of database lookup, or an indexed search.

The data retrieved by means of this query is further formatted and filtered in accordance with the capabilities of the query mechanism. In embodiments that comprise a simpler query mechanism, this formatting and filtering may be performed by proprietary auxiliary software implemented or configured by means of software-development tools known to those skilled in the art, or may be performed by off-the-shelf configurable data-formatting, lookup, or filtering tools or services known to those skilled in the art.

The query of step 303 may retrieve data according to any criteria that fit the requirements of the support personnel responsible for the monitored systems 201. Such criteria may comprise a broad range of conditions and characteristics, and may comprise, but are not limited to, selection of data associated with a particular subset of monitored systems 201; with a set of systems 201 that are owned or used by one or more specified clients or businesses; or with a particular system parameter or class of parameters, such as utilization statistics, system response times, network traffic figures, or available storage capacity.

Retrieved data may thus be associated with one or more specific types of measurement or parameter, specific types or classes of resources, particular clients, certain networks or subnetworks, particular operating environments or platforms, resources that satisfy certain operating conditions or that are associated with parameters that exceed certain thresholds, or any other combinations of criteria or characteristics that may provide useful information to support personnel.

Once the central computer 101 retrieves the queried data from raw-data repository 205, the central computer 101 may format and further filter the data in order to ensure that complete and properly formatted data is available to generate the reports and views generated in step 309. As described below, in some embodiments, this filtering may be necessary to reduce the amount of data to a level that is manageable during the procedures of the following steps of the method of FIG. 3.

Such filtering and formatting may perform combinations of functions that comprise, but are not limited to: deleting redundant data; ordering retrieved results by a combination of criteria that may include capture date, capture time, resource name, client, data type, data size, or other criteria; removing non-printing characters or other characters that are not needed for the report-generating procedures of steps 305-309; revising data types, data lengths, or other characteristics of retrieved data items so as to make them more consistent with each other or more consistent with a characteristic of the raw-data repository 205 or of the report/history repository 207; reordering data items in order to make the representation of logical data structures more consistent or to improve an efficiency of the report-generation and distribution processes of steps 305-31; deleting retrieved data that falls outside a particular time span; or deleting retrieved data that does not meet some other condition, such as exceeding a particular threshold value.

In some embodiments the filtering and formatting of step 303 may reduce the amount of raw data collected in step 301 to a tiny fraction of its original size, thus making it possible to perform subsequent steps of the method of FIG. 3 on devices or platforms, such as the local devices 209, that may have less processing power, communications bandwidth, or storage capacity of central computer 101. In some embodiments, however, all or part of steps 305-311 will be performed by the central computer 101.

At the conclusion of step 303, the raw data retrieved from the raw-data repository 203 will have been filtered and placed in a format wherein an automated means may further process it into custom reports or views tailored to the requirements of specific support personnel. This filtered data may then be in a format that is consistent with data stored in the history/report repositories 207.

In step 305, the central computer 101 retrieves historical data that had previously been archived in the history repository 207. This history repository 207 may be implemented as a standalone storage resource or may be combined with a report repository as an integrated report/history repository 207. In some embodiments, the history repository 207, the report repository 207, or the combined report/history repository 207 may be implemented as a data warehouse, in accordance with conventions and techniques known to those skilled in the art.

The retrieved historical data may be similar in format, structure, and content to the current data retrieved from the raw-data repository and formatted and filtered in step 303. If, for example, the formatted and filtered data produced in step 303 comprises three classes of memory-utilization statistics collected over the last 24 hours for all servers attached to a particular customer's North American networks, then the central computer 101 in step 305 may retrieve from the history repository 207 a similar set of archived memory-utilization statistics for the same servers, where those similar statistics had been gathered over the past two years by prior iterations of the method of FIG. 3.

This document does not intend to imply that specific details of this example are essential characteristics of all embodiments of this invention. Depending, for example, on the goals of the implementation, or of the characteristics of a report to be generated, the current statistics retrieved in step 303 may cover a period of time shorter or longer than 24 hours and the archived historical data stored in the history repository 207 may cover a span shorter or longer than two years. These time spans may be a further function of the frequency of the performance of steps of the method of FIG. 3 or of the granularity of one or more reports or views generated in step 309.

In step 305, the central computer 101 merges the current formatted, filtered data produced in step 303 with historical data retrieved from the history repository 207, to produce an integrated history of the particular type of filtered data retrieved in step 303. This integrated history extends as far back as the historical data retrieved from the history repository 207 and is as current as the data collected from the monitored systems 201 in step 301 and retrieved from the raw-data repository 205 in step 303.

In the preceding example, the merged output of step 305 might comprise data that extends from the present time (or from the time of the last data collection of step 301) to a date two years earlier, and that describes three classes of memory-utilization statistics for the customer's North American servers.

This creation of updated, merged information allows the generation of reports and views that may be analyzed by support personnel, managers, or other users to identify longer-term trends that suggest an imminent service disruption, degradation, or outage. These analyses may be performed manually or by automated means, using techniques and tools known to those skilled in the art.

In some embodiments, this merging may be performed manually, using techniques known to those skilled in the art and familiar with the resources being monitored and with the requirements of the customers.

In other embodiments, this merging may be performed automatically by means of configurable off-the-shelf or proprietary software tools. The merging might, for example, be performed through a database lookup that imports data into an Excel spreadsheet under the control of an Excel macro or Visual Basic routine. In other embodiments, the merging might be performed by an SQL query or by an other data-manipulation tool known to those skilled in the art.

In some embodiments, these integrated histories may be used to quickly generate trend analyses through a procedure of steps 301-305 that automatically identifies, extracts, formats, filters, or extrapolates specialized data comprised by the raw data stored in the raw-data repository 205. In the previous example, if memory-utilization statistics retrieved from the history repository 207 in step 305 reveal that a particular server is likely to crash when its memory utilization exceeds 80% for more two hours, and if the current formatted, filtered data retrieved in step 303 reveals that the server's memory utilization has exceeded 80% for the past hour, the integrated history produced by step 305 might be used in steps 309 to generate a report, view, or alert that warns system-management personnel to quickly divert memory-intensive tasks away from the server in order to lower its memory utilization.

In step 307, the central computer 101 updates the historical data stored in the history repository 207 by storing the merged data of step 305 in the history repository 207. This newly updated data will be retrieved during the performance of step 305 the next time that the method of FIG. 3 is performed.

In step 309, the integrated history created in step 305 by merging the formatted data of step 303 with the historical data retrieved from the history repository 207 in step 305 is used to generate one or more custom reports, charts, views, alerts, graphs, or other communications tailored to the requirements of particular support personnel or monitored resources, or of particular classes of support personnel or monitored resources.

Reports might, for example, be generated that identify network traffic throughout one or more enterprise networks; that summarize a utilization of critical resources owned by or used by one or more clients or businesses or by one or more classes of clients or businesses; that predict utilization trends for a certain class of device, such as a hard drive, in order to allow information technology personnel to determine whether to revise storage allocations; that identify trends that could lead to out-of-specification environmental conditions, such as identifying a rapidly rising computer-room temperature that might indicate an air-conditioner malfunction; that reveal systems, resources, or sites that are underutilized or that have not been serving enough users to warrant overhead costs; or that report or present any other type of information that might help information technology, network-maintenance, system-maintenance, or other support personnel better manage physical, virtual, or networked system resources that may be allocated to multiple users or clients.

In some embodiments, this step is performed all or in part by the central computer 101. But in other embodiments, the volume of reported data and the frequency of report generation may be low enough to allow step 309 to be performed by local or portable devices 209, which may comprise, but are not limited to, a combination of notebook computers, networked workstations, cellular devices, smartphones, tablets, virtual or emulated devices provisioned on one or more physical computing resources, or other virtual or physical software or hardware platforms.

In cases, the central computer 101 may forward the data necessary to generate such reports directly to the local devices 209 at the outset of step 309, in order to allow the local devices to generate the reports. In such embodiments, users may in step 309 or 311 be given an opportunity to further customize the reports or to set parameters by which alerts or other related communications are generated or communicated to the users.

In other cases, the central computer 101 may store the data necessary to generate the reports in the report repository 207, allowing a local device 209 to retrieve the stored data from the report repository 207, rather than receiving the data directly from the central computer 101. In other embodiments, the central computer 101 may in similar manner store generated reports in the report repository 207, from which a local device 209 may retrieve one or more of the generated reports. Selection of these reports by a particular local device 209 may be a function of parameters or characteristics of the reports, of extrinsic conditions, of a client, of a particular support specialist, of a user selection, or of other criteria, where those criteria may be specific to the local device 209.

In step 311, the reports or other information formatted for display in step 309 are displayed on the local devices 209 to support personnel or other users. If this displayed information was generated in step 311 by the central computer 101, it may be forwarded in this step to the local devices 209 for display or local storage.

In some embodiments, the central computer 101 may in step 307 store the merged data in the history repository, where it is retrieved by local devices 209 in step 309, which then translate this retrieved merged data into the reports.

In some embodiments, the central computer 101 may in step 309 store the generated reports in the report repository, where it is retrieved by local devices 209 in step 311, which then display these retrieved reports to users, alert a user that the report is available, or forward the report to an other device associated with a user, such as a personal cell phone.

In some embodiments, the reports or views are displayed in step 311 by means of a software interface or "dashboard" displayed on a local device 209. This interface may be customized for particular users or classes of users, and may offer each user or class of user a different set of reports, views, or alerts tailored to that user's security or authorization level, job description, client affiliation, skill set, job docket, work schedule, or other characteristic.

In some cases, a local device 209 may be dedicated to a particular user or class of users and, in such cases, a choice of available reports, views, or alerts available for display by that device may be a function of this dedication.

At the completion of step 311, the current iteration of the method of FIG. 3 ends. But in some embodiments, this method may be repeated continuously. Systems 201 may be monitored at all times and raw data may be continuously collected and stored in the raw-data repository 205, as in step 301. In such embodiments, the query/formatting, filtering, merging, report-generation, and report-distribution steps of steps 303-311 may be performed periodically or on demand, but when they are performed, they will always begin by retrieving all or part of the most current data gathered in step 301.

At the conclusion of step 311, support personnel who, as users, gained access to the reports displayed or distributed in step 311 may further process the information in this report by means of other applications, or by manual means known to those skilled in the art of system maintenance, statistical analysis, or information technology. This further processing may comprise a combination of any of a wide variety of maintenance and trend-analysis functions, services, or applications, using techniques and methods that may comprise combinations of scripts, automated or partially automated spreadsheet workbooks, or graphical user interfaces.

What is claimed is:

1. A method for generating performance and capacity statistics, the method comprising:
   a processor of a computer system receiving a first set of statistical information from a raw-data repository, wherein the first set was stored in the raw-data repository by at least one monitoring entity, and wherein the first set identifies a first characteristic of a first monitored resource of a plurality of monitored resources;
   the processor performing a predefined query on the first set of statistical information, wherein the query extracts a first subset of the first set of statistical information, wherein the predefined query further filters the first subset in order to make a first logical data format of the first subset consistent with a second logical data format of the second subset of historical data, wherein the filtering comprises functions selected from the group comprising: removing characters, reordering data elements, reordering records, and adjusting a data element's storage format, and wherein the first subset is associated with the first characteristic;
   the processor retrieving a second subset of historical data from a history repository, wherein the second subset is associated with the first characteristic over a time period that extends back to an earlier point in time, and wherein the earlier point in time precedes the earliest time at which the first set was stored in the raw-data repository;
   the processor merging the first subset with the second subset such that the merged data is associated with the first characteristic throughout an integrated period of time that extends from the earlier point in time to the earliest time at which the first set was stored in the raw-data repository;
   the processor storing the merged data in the history repository;
   the processor representing the merged data as a set of reports, wherein the set of reports represents the first characteristic over the integrated period of time;

the processor forwarding the set of reports to a report repository.

2. The method of claim 1, further comprising:
the processor distributing a third subset of the generated set of reports to a local device, wherein the generated set of reports are distributed in such a way that the user of the local device may interactively select which reports to review, store, or forward; and
wherein a report of the third subset is chosen as a function of a parameter chosen from the group comprising: the first characteristic of the first monitored resource, a characteristic of the local device, and a characteristic of a user of the local device.

3. The method of claim 2, wherein the receiving comprises continuously receiving.

4. The method of claim 1, wherein a report of the generated set of reports identifies a trend associated with the first characteristic, and wherein the identification of the trend is associated with a condition that might lead to a disruption of the first monitored resource.

5. The method of claim 1, wherein the history repository and the report repository are comprised by a same data warehouse.

6. The method of claim 1, further comprising the processor further receiving a second set of statistical information from the raw-data repository, wherein the second set identifies a second characteristic of the first monitored resource and wherein a report of the generated set of reports identifies a trend associated with a correlation of the first characteristic with the second characteristic.

7. The method of claim 1, further comprising:
the processor further receiving a second set of statistical information from the raw-data repository, wherein the second set identifies a second characteristic of a second monitored resource of the plurality of monitored resources, wherein the second set is formatted in a second logical data format, and wherein the second logical data format is inconsistent with a first logical data format of the first set of statistical information; and
the processor reformatting the second set into a third logical data format, such that the third logical data format is consistent with the first logical data format.

8. The method of claim 1, further comprising providing at least one support service for at least one of creating, integrating, hosting, maintaining, and deploying computer-readable program code in the computer system, wherein the computer-readable program code in combination with the computer system is configured to implement the receiving, performing, retrieving, merging, storing, representing, and forwarding.

9. A computer program product, comprising a computer-readable hardware storage device having a computer-readable program code stored therein, said program code configured to be executed by a processor of a computer system to implement a method for generating performance and capacity statistics, the method comprising:
the processor receiving a first set of statistical information from a raw-data repository, wherein the first set was stored in the raw-data repository by at least one monitoring entity, and wherein the first set identifies a first characteristic of a first monitored resource of a plurality of monitored resources;
the processor performing a predefined query on the first set of statistical information, wherein the query extracts a first subset of the first set of statistical information, wherein the predefined query further filters the first subset in order to make a first logical data format of the first subset consistent with a second logical data format of the second subset of historical data, wherein the filtering comprises functions selected from the group comprising: removing characters, reordering data elements, reordering records, and adjusting a data element's storage format, and wherein the first subset is associated with the first characteristic;
the processor retrieving a second subset of historical data from a history repository, wherein the second subset is associated with the first characteristic over a time period that extends back to an earlier point in time, and wherein the earlier point in time precedes the earliest time at which the first set was stored in the raw-data repository;
the processor merging the first subset with the second subset such that the merged data is associated with the first characteristic throughout an integrated period of time that extends from the earlier point in time to the earliest time at which the first set was stored in the raw-data repository;
the processor storing the merged data in the history repository;
the processor representing the merged data as a set of reports, wherein the set of reports represents the first characteristic over the integrated period of time;
the processor forwarding the set of reports to a report repository.

10. The computer program product of claim 9, further comprising:
the processor distributing a third subset of the generated set of reports to a local device, wherein the generated set of reports are distributed in such a way that the user of the local device may interactively select which reports to review, store, or forward; and
wherein a report of the third subset is chosen as a function of a parameter chosen from the group comprising: the first characteristic of the first monitored resource, a characteristic of the local device, and a characteristic of a user of the local device.

11. The computer program product of claim 9, wherein a report of the generated set of reports identifies a trend associated with the first characteristic, and wherein the identification of the trend is associated with a condition that might lead to a disruption of the first monitored resource.

12. The computer program product of claim 9, wherein the history repository and the report repository are comprised by a same data warehouse.

13. The computer program product of claim 9, further comprising the processor further receiving a second set of statistical information from the raw-data repository, wherein the second set identifies a second characteristic of the first monitored resource and wherein a report of the generated set of reports identifies a trend associated with a correlation of the first characteristic with the second characteristic.

14. The computer program product of claim 9, further comprising:
the processor further receiving a second set of statistical information from the raw-data repository, wherein the second set identifies a second characteristic of a second monitored resource of the plurality of monitored resources, wherein the second set is formatted in a second logical data format, and wherein the second logical data format is inconsistent with a first logical data format of the first set of statistical information; and
the processor reformatting the second set into a third logical data format, such that the third logical data format is consistent with the first logical data format.

15. The computer program product of claim 9, wherein the receiving comprises continuously receiving.

16. A computer system comprising a processor, a memory coupled to said processor, and a computer-readable hardware storage device coupled to said processor, said storage device containing program code configured to be run by said processor via the memory to implement a method for generating performance and capacity statistics, the method comprising:

the processor receiving a first set of statistical information from a raw-data repository, wherein the first set was stored in the raw-data repository by at least one monitoring entity, and wherein the first set identifies a first characteristic of a first monitored resource of a plurality of monitored resources;

the processor performing a predefined query on the first set of statistical information, wherein the query extracts a first subset of the first set of statistical information, wherein the predefined query further filters the first subset in order to make a first logical data format of the first subset consistent with a second logical data format of the second subset of historical data, wherein the filtering comprises functions selected from the group comprising: removing characters, reordering data elements, reordering records, and adjusting a data element's storage format, and wherein the first subset is associated with the first characteristic;

the processor retrieving a second subset of historical data from a history repository, wherein the second subset is associated with the first characteristic over a time period that extends back to an earlier point in time, and wherein the earlier point in time precedes the earliest time at which the first set was stored in the raw-data repository;

the processor merging the first subset with the second subset such that the merged data is associated with the first characteristic throughout an integrated period of time that extends from the earlier point in time to the earliest time at which the first set was stored in the raw-data repository;

the processor storing the merged data in the history repository;

the processor representing the merged data as a set of reports, wherein the set of reports represents the first characteristic over the integrated period of time;

the processor forwarding the set of reports to a report repository.

17. The computer system of claim 16, further comprising:

the processor distributing a third subset of the generated set of reports to a local device, wherein the generated set of reports are distributed in such a way that the user of the local device may interactively select which reports to review, store, or forward; and wherein a report of the third subset is chosen as a function of a parameter chosen from the group comprising: the first characteristic of the first monitored resource, a characteristic of the local device, and a characteristic of a user of the local device.

* * * * *